United States Patent
Rácz et al.

(10) Patent No.: US 11,396,322 B2
(45) Date of Patent: Jul. 26, 2022

(54) MOISTURE SENSING IN ELECTRIC MOTORS OF MOTOR VEHICLE STEERING SYSTEMS WITH PULL UP RESISTOR

(71) Applicants: THYSSENKRUPP PRESTA AG, Eschen (LI); thyssenkrupp AG, Essen (DE)

(72) Inventors: Gergely Rácz, Budapest (HU); Attila Konfár, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 549 days.

(21) Appl. No.: 16/326,801

(22) PCT Filed: Aug. 23, 2016

(86) PCT No.: PCT/EP2016/069902
§ 371 (c)(1),
(2) Date: Feb. 20, 2019

(87) PCT Pub. No.: WO2018/036615
PCT Pub. Date: Mar. 1, 2018

(65) Prior Publication Data
US 2019/0193780 A1 Jun. 27, 2019

(51) Int. Cl.
*B62D 5/04* (2006.01)
(52) U.S. Cl.
CPC ......... *B62D 5/0487* (2013.01); *B62D 5/046* (2013.01); *B62D 5/0409* (2013.01)
(58) Field of Classification Search
CPC ..... B62D 5/0487; B62D 5/046; B62D 5/0409
See application file for complete search history.

(56) References Cited

U.S. PATENT DOCUMENTS

| 7,275,458 B2 * | 10/2007 | Kinme | B62D 1/189 |
| | | | 280/775 |
| 2006/0259221 A1 * | 11/2006 | Murty | B62D 5/063 |
| | | | 701/41 |

(Continued)

FOREIGN PATENT DOCUMENTS

| CN | 101056086 A | 10/2007 |
| CN | 202728325 U | 2/2013 |

(Continued)

OTHER PUBLICATIONS

English Translation of International Search Report issued in PCT/EP2016/069902, dated Apr. 12, 2017.

*Primary Examiner* — Jacob D Knutson
(74) *Attorney, Agent, or Firm* — thyssenkrupp North America, LLC

(57) ABSTRACT

A motor vehicle steering system may include an electric motor disposed in a motor housing. The electric motor may have at least three phases, and for each phase a high side MOSFET and a low side MOSFET may be assigned. The MOSFETs may be part of an inverter that supplies voltages into the electric motor. A first non-insulated contact point of the electric motor and a second non-insulated contact point of the motor housing may be configured such that water that ingresses into the motor housing electrically connects the electric motor with the motor housing via the non-insulated contact points. A pull-up resistor may be disposed in parallel with one of the high side MOSFETs of one of the at least three phases. A measurement unit may detect a phase voltage of the one of the at least three phases as being indicative of water present in the motor housing.

19 Claims, 1 Drawing Sheet

(56) References Cited

U.S. PATENT DOCUMENTS

| | | |
|---|---|---|
| 2007/0211396 A1 | 9/2007 | Gunji |
| 2009/0021091 A1 | 1/2009 | Shiino |
| 2011/0199030 A1 | 8/2011 | Suzuki |
| 2013/0113405 A1 | 5/2013 | Baranyai |
| 2013/0140104 A1* | 6/2013 | Dzsudzsak ........... H02H 7/1225 180/404 |
| 2013/0248277 A1 | 9/2013 | Hagiwara |
| 2014/0055059 A1* | 2/2014 | Uryu .................... B62D 5/0484 318/9 |
| 2015/0175192 A1* | 6/2015 | Sin ....................... B62D 5/0484 318/483 |
| 2016/0094180 A1 | 3/2016 | Ajima |
| 2016/0362136 A1* | 12/2016 | Oya .......................... B60R 1/00 |
| 2018/0178830 A1* | 6/2018 | Koseki ................ H02P 29/0241 |

FOREIGN PATENT DOCUMENTS

| | | |
|---|---|---|
| CN | 103318251 A | 9/2013 |
| CN | 105471360 A | 4/2016 |
| DE | 102014007502 A | 11/2015 |
| FR | 2723904 A | 3/1996 |

* cited by examiner

MOISTURE SENSING IN ELECTRIC MOTORS OF MOTOR VEHICLE STEERING SYSTEMS WITH PULL UP RESISTOR

CROSS REFERENCE TO RELATED APPLICATIONS

This application is a U.S. National Stage Entry of International Patent Application Serial Number PCT/EP2016/069902, filed Aug. 23, 2016, the entire contents of which are incorporated herein by reference.

FIELD

The present disclosure generally relates to steering systems, including electric motors of steering systems for motor vehicles.

BACKGROUND

Electric power assisted steering systems use electric motor to assist the driver of a motor vehicle in steering operation. The electric motor is accommodated in a motor housing, generally on which a control device comprising a power electronics unit for controlling the electric motor is also disposed. The electric motor is usually located in an exposed position of the lower vehicle part. If the vehicle is driven on a wet road or a lower part of the vehicle is submerged in water, moisture permeates into the interior of the electric motor. If an excessive amount of moisture penetrates the electric motor, the motor may break down and driving of the electric motor may be stopped, hampering driving safety. Further moisture can lead to long-term damage like corrosion.

US 2015/0175192 A1 discloses a rack type electric power steering system with a moisture detection sensor attached to a power steering motor to detect moisture penetrating into the motor. The moisture detection sensor is a sensor for detecting moisture to output an electrical signal, and includes an infrared ray absorption type, a microwave type, and an electrical resistance type. The moisture sensor can detect large quantities of water inside the motor housing. However, these sensors are cost intensive and are not able to detect small amounts of moisture.

Thus a need exists for a motor vehicle steering system with an improved and reliable sensor for detection of water penetration in the electric motor unit.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a motor vehicle steering system with an electric motor arranged in a motor housing, the electric motor having at least three phases, wherein for each phase a high side MOSFET and a low side MOSFET is assigned, the MOSFETs being part of an inverter which supply voltages into the electric motor is proposed, wherein the electric motor has a first non-insulated contact point and the motor housing has a second non-insulated contact point, wherein the two contact points are design such that water ingressed into the motor housing can electrically connect the electric motor with the motor housing via the non-insulated contact points and that a pull-up resistor is placed in parallel to one of the high side MOSFETs of a certain phase, wherein a measurement unit is configured to detect the certain phase voltage as an indicative of water being present in the motor housing. By using the electric motor and the housing itself as part of a water detection sensor, an expensive additional sensor can be dispensed. The electrical connection between the two contact points depends on the conductivity of the liquid connecting the two points. It can have a high electrical resistance.

Preferably, the motor housing is grounded. In one embodiment the measurement unit comprises a microcontroller and a series resistor connected to ground. In another embodiment the measurement unit comprises a microcontroller and a voltage divider connected to ground.

Advantageously, the first non-insulated contact point is located close to the lowest point of the motor housing.

It is preferred that the pull-up resistor is connected to a vehicle power-supply voltage.

Preferably, the electric motor is a three-phase electric motor. The motor vehicle steering system can be an electric power assisted steering system or a steer-by-wire system.

Figure 1:
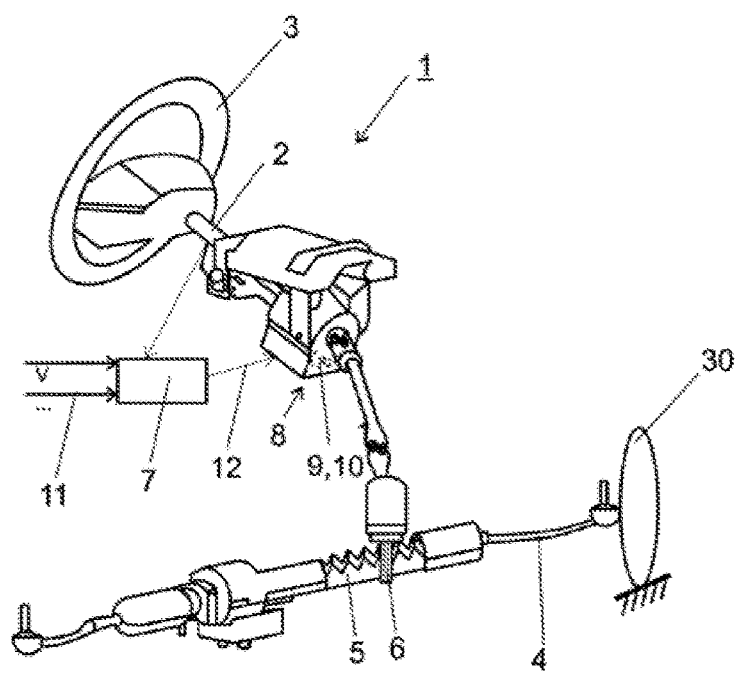
FIG. 1 is a schematic view of an example electromechanical power steering mechanism.

In FIG. 1 an electromechanical power steering mechanism 1 is schematically illustrated with a steering shaft 2 connected to a steering wheel 3 for operation by the driver. The steering shaft 2 is coupled to a steering rack 5 via a gear pinion 6. Steering rack rods 4 are connected to the steering rack 5 and to steered wheels 30 of the motor vehicle. A rotation of the steering shaft 2 causes an axial displacement of the steering rack 5 by means of the gear pinion 6 which is connected to the steering shaft 2 in a torque-proof manner. Electric power assist is provided through a steering controller 7 and a power assist actuator 8 comprising the electric motor 9 and a motor controller 10. The steering controller 7 in the example receives signals 11 representative of the vehicle velocity v and the torque TTS applied to the steering wheel by the vehicle operator. In response to the vehicle velocity v, the operator torque TTS and the rotor position signal detected by a rotor position sensor 90 (see FIG. 2), the controller 7 determines the target motor torque $T_d$ and provides the signal 12 through to the motor controller 10, where the motor currents are calculated via PWM (pulse-width modulation). In addition, as the rotor of the electric motor 9 turns, rotor position signals are generated within the electric motor 9 and provided to the steering controller 7. The electric motor 9 is a permanent magnet-excited motor.

The present invention relates to electric motors in motor vehicle steering system in general, in particular to electromechanical motor vehicle power steering mechanisms or steer-by-wire systems of motor vehicles.

In the following possible electric motor applications are described which are not limiting.

To provide steering assistance, the electric motor 9 can be mounted to the side of the rack housing e.g. driving a ball-screw mechanism via a toothed rubber belt and/or the rack-and-pinion gear system. Further an electric motor can be arranged supporting the rotation of the steering shaft. In steer-by-wire-systems, the electric motor can be part of the feedback actuator.

Figure 2:
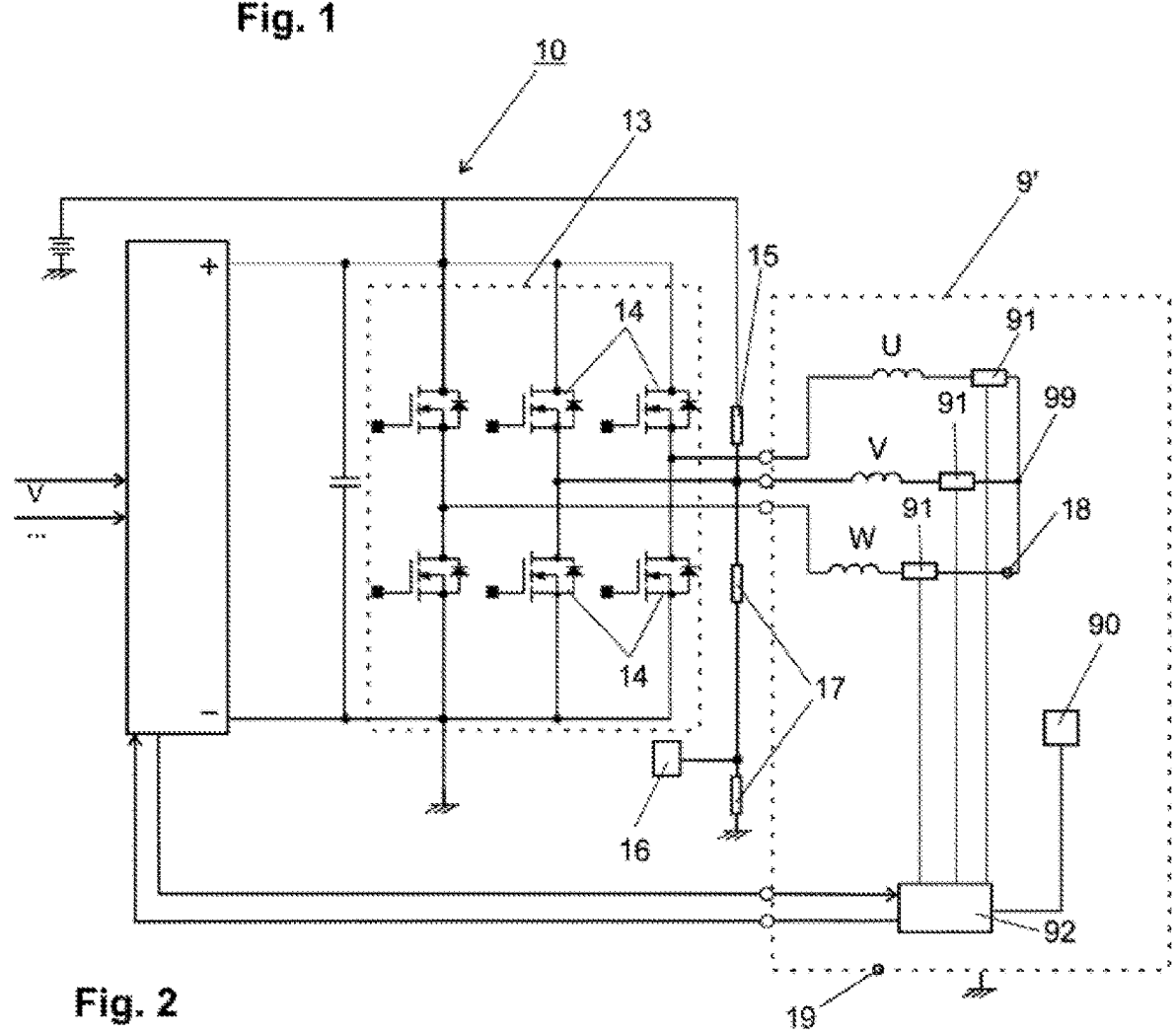
FIG. 2 is a schematic view of an example motor controller.

In FIG. 2 the motor controller 10 with an inverter 13 is shown. The inverter feeds the motor with motor parameters (current, voltage, magnetic flux). The inverter 13 transforms voltages into the three-dimensional coordinate system of the motor 9 and sensors transform the voltages into motor currents $I_U$, $I_V$, $I_W$. In the example of FIG. 2 is shown a current measurement of the motor coils by shunt resistors 91 and a sensor circuit 92. The servomotor 9 is actuated by the control unit via a set of MOSFETs 14, wherein with three phase windings six MOSFETs 14 are provided in total. For each winding a high side MOSFET and a low side MOSFET are included. Each MOSFET 14 switches the assigned phase winding U, V, W to the on-board vehicle power-supply voltage or the earth potential. This occurs at a high frequency so that the temporal average value acts as the effective voltage in the phase windings U, V, W. The phase windings U, V, and W are connected to one another at a neutral point 99 in a star point of the motor 9. The motor 9 is arranged in a motor housing 9' which is connected to ground.

A simple pull-up resistor 15 is placed in parallel to one of the high side MOSFETs. A microcontroller (MCU) 16 measures the potential, which is predefined by the pull-up resistor 15. It comprises a series resistor or a voltage divider 17 connected to ground, as shown in FIG. 2. In dry conditions the input pin of the microcontroller will read a high state. A small amount of current is flowing between the battery and the input pin, thus the input pin reads close to battery potential. If there is moisture or water in the motor, its resistance will pull down the phase voltage to ground because water connects the windings to the chassis, which is directly connected to ground. The current flows through the resistor to ground, thus the input pin of the MCU 16 reads a low state.

This solution requires two contact points—a first contact point 18 at the motor and a second contact point 19 at the motor housing. Usually during motor assembly, there are welded points between the windings and the contact rings, which are normally the only points without insulation. But motor windings can also be made out of copper wire with no insulation layer at all. Since the motor housing is generally made out of aluminum, contact points at the motor housing are given.

Moisture or water in the housing will shorten the contact points resulting in a pull-down effect and a voltage drop across the resistor.

The MCU is configured to detect a condition indicative of water being present.

The presence of the pull-up resistor in the electric control unit (ECU) has only minimal effect on the systems' operation and performance.

What is claimed is:

1. A motor vehicle steering system comprising:
   a motor housing;
   an electric motor disposed in the motor housing, the electric motor having at least three phases, wherein the electric motor has a first non-insulated contact point and the motor housing has a second non-insulated contact point, wherein the first and second non-insulated contact points are configured such that water that ingresses into the motor housing electrically connects the electric motor with the motor housing via the first and second non-insulated contact points;
   an inverter that supplies voltages into the electric motor, wherein a high side MOSFET and a low side MOSFET are assigned for each of the at least three phases of the electric motor, the MOSFETS being part of the inverter;
   a pull-up resistor disposed in parallel with one of the high side MOSFETS of one of the at least three phases; and
   a measurement unit configured to detect a phase voltage of the one of the at least three phases as being indicative of water present in the motor housing.

2. The motor vehicle steering system of claim 1 wherein the motor housing is grounded.

3. The motor vehicle steering system of claim 1 wherein the measurement unit comprises a microcontroller and a series resistor connected to ground.

4. The motor vehicle steering system of claim 1 wherein the measurement unit comprises a microcontroller and a voltage divider connected to ground.

5. The motor vehicle steering system of claim 1 wherein the first non-insulated contact point is disposed at a lowest point of the motor housing.

6. The motor vehicle steering system of claim 1 wherein the pull-up resistor is connected to a vehicle power-supply voltage.

7. The motor vehicle steering system of claim 1 wherein the electric motor is a three-phase electric motor.

8. The motor vehicle steering system of claim 1 configured as an electric power assisted steering system.

9. The motor vehicle steering system of claim 1 configured as a steer-by-wire system.

10. A motor vehicle steering system comprising:
    a motor housing;
    an electric motor disposed in the motor housing, the electric motor having at least three phases, wherein the electric motor has a first non-insulated contact point and the motor housing has a second non-insulated contact point, wherein the first and second non-insulated contact points are configured such that water that ingresses into the motor housing electrically connects the electric motor with the motor housing via the first and second non-insulated contact points;
    an inverter that supplies voltages into the electric motor, wherein a high side MOSFET and a low side MOSFET are assigned for each of the at least three phases of the electric motor, the MOSFETS being part of the inverter;
    a pull-up resistor disposed in parallel with one of the high side MOSFETS of one of the at least three phases; and
    a measurement unit configured to detect a phase voltage of the one of the at least three phases as being indicative of water present in the motor housing, wherein the phase voltage is predefined by the pull-up resistor, wherein the measurement unit is configured to read a high voltage state when the motor housing is dry and a low voltage state when the motor housing contains moisture or water.

11. The motor vehicle steering system of claim 10 wherein the measurement unit is a microcontroller with a series register or a voltage divider connected to ground.

12. The motor vehicle steering system of claim 10 configured such that current flows between a battery and an input pin of the measurement unit when the motor housing is dry.

13. The motor vehicle steering system of claim 10 configured such that water present in the motor housing connects windings of the electric motor to a chassis that is connected to ground, thereby pulling down the phase voltage to ground.

14. The motor vehicle steering system of claim 10 configured to detect moisture or water in the motor housing via the pull-up resistor.

15. A motor vehicle steering system comprising:

a motor housing;

an electric motor disposed in the motor housing, the electric motor having at least three phases, wherein the electric motor has a first non-insulated contact point and the motor housing has a second non-insulated contact point, wherein the first and second non-insulated contact points are configured such that water that ingresses into the motor housing electrically connects the electric motor with the motor housing via the first and second non-insulated contact points;

an inverter that supplies voltages into the electric motor, wherein a high side MOSFET and a low side MOSFET are assigned for each of the at least three phases of the electric motor, the MOSFETS being part of the inverter;

a pull-up resistor disposed in parallel with one of the high side MOSFETS of one of the at least three phases; and a measurement unit configured to detect a phase voltage of the one of the at least three phases as being indicative of water present in the motor housing, with the phase voltage being predefined by the pull-up resistor.

16. The motor vehicle steering system of claim 15 wherein the measurement unit is configured to read a high voltage state when the motor housing is dry and a low voltage state when the motor housing contains moisture or water.

17. The motor vehicle steering system of claim 15 wherein the pull-up resistor is connected to a vehicle power-supply voltage.

18. The motor vehicle steering system of claim 15 configured such that current flows between a battery and an input pin of the measurement unit when the motor housing is dry.

19. The motor vehicle steering system of claim 15 configured such that water present in the motor housing connects windings of the electric motor to a chassis that is connected to ground, thereby pulling down the phase voltage to ground.

* * * * *